United States Patent [19]

Campbell

[11] Patent Number: 4,556,762
[45] Date of Patent: Dec. 3, 1985

[54] UNIVERSAL ADJUSTABLE TELEPHONE HANDSET HOLDER

[76] Inventor: Robert A. Campbell, 536 N. Harvey Ave., Oak Park, Ill. 60302

[21] Appl. No.: 552,802

[22] Filed: Nov. 17, 1983

[51] Int. Cl.[4] ............................................. H04M 1/05
[52] U.S. Cl. .................................................... 179/157
[58] Field of Search ................... 179/157; 455/89, 100

[56] References Cited

U.S. PATENT DOCUMENTS

| | | |
|---|---|---|
| 1,304,718 | 5/1919 | Townsend . |
| 2,493,954 | 1/1950 | Epstein . |
| 2,554,967 | 5/1951 | Szoke . |
| 2,644,043 | 6/1953 | Zakos . |
| 2,745,906 | 5/1956 | Bolton . |
| 2,802,062 | 8/1957 | Dalton ................................ 179/157 |
| 3,130,276 | 4/1964 | Coviello . |
| 3,176,087 | 3/1965 | Schetzer . |
| 3,347,998 | 10/1967 | Cunningham . |
| 3,435,158 | 3/1969 | Darrasse . |
| 3,567,871 | 3/1971 | Walter . |
| 3,830,987 | 8/1974 | Van Dyke ........................... 179/157 |

FOREIGN PATENT DOCUMENTS

| | | |
|---|---|---|
| 545080 | 10/1956 | Belgium . |
| 14118 | 1/1911 | Denmark ............................. 179/157 |
| 356794 | 9/1921 | Fed. Rep. of Germany ...... 179/157 |
| 756825 | 6/1933 | France . |
| 1120165 | 7/1956 | France . |
| 299759 | 8/1932 | Italy . |

OTHER PUBLICATIONS

Transmittal Letter from Applicant, dated Nov. 17, 1983.

*Primary Examiner*—Thomas W. Brown
*Assistant Examiner*—L. C. Schroeder
*Attorney, Agent, or Firm*—Henderson & Sturm

[57] ABSTRACT

A universal, adjustable telephone handset holder for attachment to a telephone handset and have a portion thereon for abutment with the top of a person's shoulder. The holder also has an elastic structure for extending around a person's neck and biasing the holder toward such person's neck to thereby positively hold the handset against such person's head in a proper position for use.

16 Claims, 14 Drawing Figures

U.S. Patent   Dec. 3, 1985   Sheet 1 of 2   4,556,762
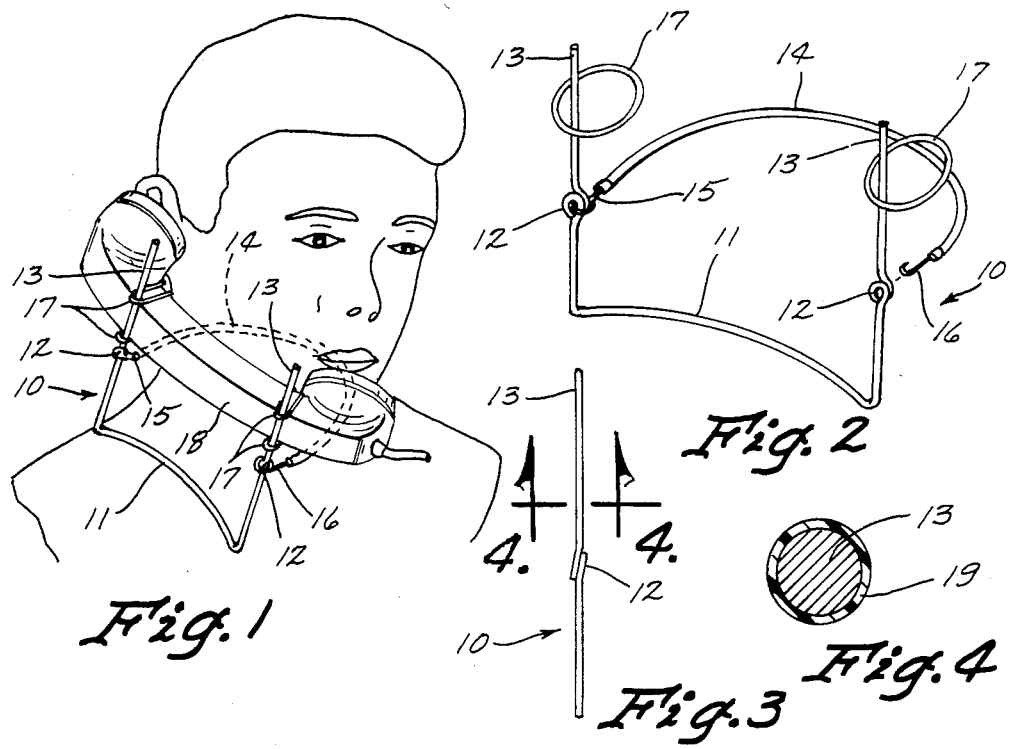
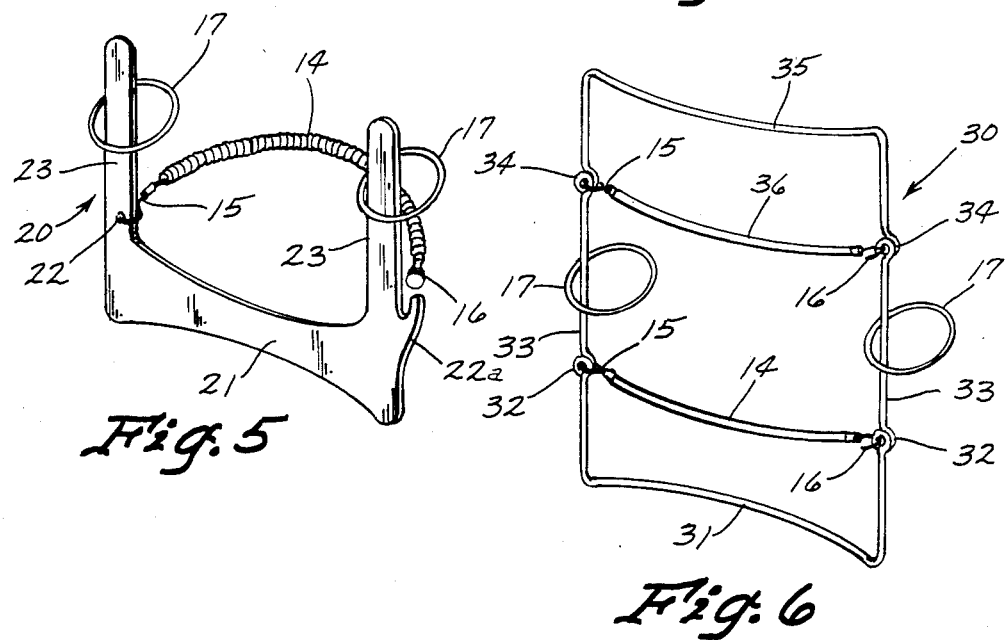

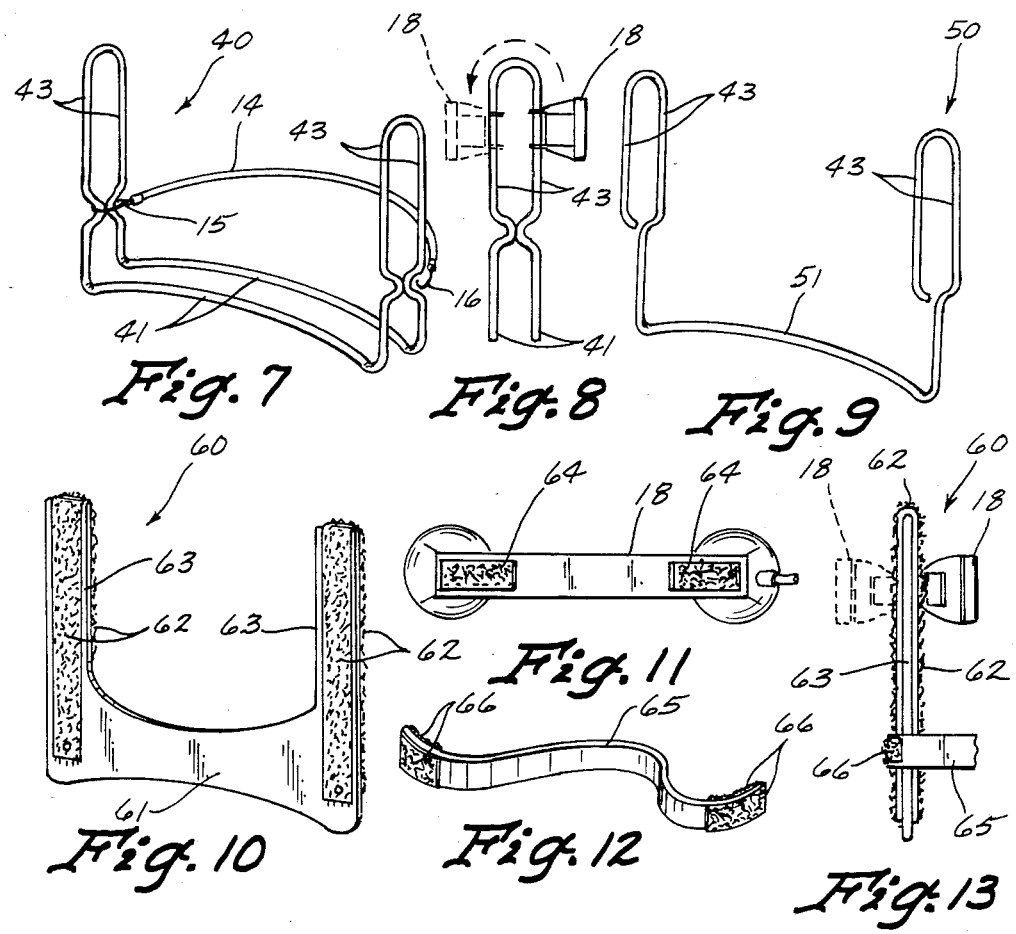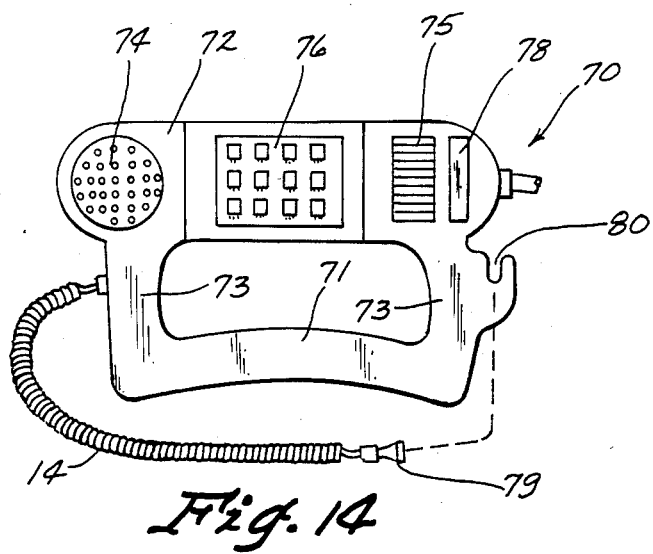

UNIVERSAL ADJUSTABLE TELEPHONE HANDSET HOLDER

TECHNICAL FIELD

The present invention relates to a holder for telephone headsets of a type which facilitates the use of a telephone without utilizing a person's hands, and more particularly to such a handset holder which holds the telephone handset firmly against the user's ear.

BACKGROUND ART

Over the years many devices have been developed for holding a telephone handset so that a person can talk on the telephone while freeing one's hands for other uses, such as for writing down messages at the same time as talking on the telephone. For example, U.S. Pat. Nos. 3,130,276 to Coviello and 3,435,158 to Darrasse show devices which are attached to telephones and have a portion which rests on a person's shoulder and another hood portion for being received around such person's neck. U.S. Pat. No. 2,644,043 shows a telephone handset holder which is attached to a telephone handset and which clamps around the front and back of a person's shoulder for holding such telephone in place.

It appears that the most commercially successful telehone handset structures is a simple device which attaches to a telephone handset and has a portion for being received on a person's shoulder. The telephone is then merely wedged between the person's head and ear and against the shoulder, and which requires the user to cock his head to one side and apply such pressure to keep the telephone in place.

In each of the aforementioned instances, the devices of of the prior art require that the user hold his head and ear in a certain position in order to be in close proximity to the telephone handset and rather than having a telephone handset holder which automatically maintains the telephone handset in the desired position.

Accordingly, there is a need for a device which will fulfill this last mentioned need.

DISCLOSURE OF THE INVENTION

The present invention relates to a universal, adjustable telephone handset holder for attachment to a telephone handset and having a portion thereon for abutment with the top of a person's shoulder. The holder also has an elastic structure for extending around a person's neck and biasing the holder toward such person's neck to thereby positively holding the handset against such person's head in a proper position for use.

An object of the present invention is to provide an improved telephone handset holder.

Another object of the invention is to provide a telephone handset holder which holds the telephone handset in a proper position irrespective of the position in which a person's head is held.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of one embodiment of the present invention relating to a universal, adjustable telephone handset holder;

FIG. 2 is a perspective view of the apparatus of FIG. 1 without the telephone handset attached thereto;

FIG. 3 is a side elevational view of the frame portion of the apparatus in FIGS. 1 and 2;

FIG. 4 is a cross-sectional view taken along line 4—4 of FIG. 3;

FIG. 5 shows a perspective view of an alternative embodiment of the present invention;

FIG. 6 shows still another alternate embodiment of the present invention;

FIG. 7 shows still another alternate embodiment of the present invention;

FIG. 8 shows side elevational view of embodiment of FIG. 7 and showing how a telephone handset can be changed from left hand to right hand without removing the handset from the holder;

FIG. 9 shows still another embodiment of the present invention;

FIG. 10 shows an embodiment similar to FIG. 5 but having Velcro on each side thereof;

FIG. 11 shows a telephone handset modified to have Velcro thereon for use with the embodiment shown in FIG. 10;

FIG. 12 shows an elastic strap for use in the embodiment of FIG. 10;

FIG. 13 shows the embodiment of FIGS. 10–12 and showing how the telephone handset is easily movable from the left hand model to a right hand model; and FIG. 14 shows still another embodiment of the present invention wherein the telephone holder is built in one piece and integral with the telephone handset.

BEST MODES FOR CARRYING OUT THE INVENTION

Referring now to the drawings wherein like reference numerals designate identical or corresponding parts throughout the several views, FIG. 1 shows a universal, adjustable telephone handset holder (10) constructed in accordance with the present invention.

The handset holder (10) is comprised of a wire frame (11) having a pair of loops (12) formed about a third of the way up from the vertical end portions (13). A spiral coiled cord (14) is attached by a hook (15) to one of the loops (12) on the upper extending portion (13) of the wire frame (11). An enlarged member (16) is provided on the other end of the spiral coiled cord (14) for reasons which will be discussed below. Elastic rubber bands (17) are also provided for fastening the telephone handset to the straight vertical frame post (13). In use, for example as shown in FIGS. 1 and 2, the rubber band (17) is placed over the posts (13). Then the rubber band (17) is brought up over the handset core and again is placed over the post (13). When both rubber bands (17) are placed around the handset (18) and thereby secured to a post (13), it forms a very secure and stable structure for retaining a handset (18) on the frame (11). The handset (18) can still be moved either up or down on the frame (11) to adjust it for correct and comfortable positioning of the ear receiver adjacent to the ear, and the mouth piece will automatically be in proper alignment with the mouth. A variety of different materials can be utilized for construction of the frame (11). For example, it can be made from bent aluminum wire, bent vinyl coated steel wire as is shown in FIG. 4, bent Lucite plastic rod or other similar elongated materials.

Referring now to the embodiment of FIG. 5, it is noted that the handset holder (20) is formed of a flat sheet material such as aluminum, steel, die cut sheet plastic, or die cut corregated cardboard. It can also be made from molded plastic, if so desired. This particular embodiment (20) of FIG. 5 has a lower portion (21) which is shaped for abutment with a person's shoulder and has upstanding posts (23) for attaching the telephone handset (18) thereto precisely in the same fashion as explained above with respect to the FIGS. 1-4 embodiment. Rubber bands (17) are also again provided for attaching a handset to the posts (23) and a coiled or elastic strap (14) is attached to openings (22) in the holder (20) in precisely the same fashion, by means of a hook (15) and an enlarged member (16) which fits into notch (22a) to hold the elastic strap in place.

The embodiment of FIG. 5, especially if corregated cardboard is used, could be given away as an advertising specialty and have advertising printed thereon; and, because of its low cost, could be available for almost anyone to use.

Referring now to FIG. 6, a holder (30) is shown which is somewhat rectangular in shape. Rubber bands (17) are utilized to connect the handset to the central part of the shaft (33) at approximately the position that the rubber bands (17) are shown in FIG. 6. Loops (32) are formed in the bottom section of the upstanding posts (33) and loops (34) are disposed in the upper portion of the upstanding posts (33). The telephone handset (18) would then be attached to either side of the holder (30) at the approximate position that the rubber bands (17) are shown in FIG. 6. Consequently, if a person wants to use the telephone handset to listen from either the right ear or the left ear, the handset would be attached to the appropriate side of the frame (33). Assume for the moment that the telephone handset (18) is used in the fashion shown in FIG. 1, whereby the portions (31) of the FIG. 6 embodiment would be positioned against the person's right ear while utilizing the lower elastic strap (14) precisely in the fashion described above. If it is later desired to have a telephone handset (18) on the other side of such person or perhaps on the other side of a different person who preferred to listen out of the left ear, then the holder (30) would merely be flipped over, whereby the portion (35) of the holder (30) would be positioned on the left shoulder of such user and a top strap (36) would be utilized precisely in the same fashion as strap (14) as utilized in aforementioned embodiments. Consequently, with a holder of this type, the telephone handset can be used easily with either ear.

Referring now to FIGS. 7 and 8, it is noted that still another embodiment (40) is shown. This telephone handset holder (40) has two parallel sides (43) and two curved bases (41). With this type of a system, the handset (18) can be easily flipped to either side of such double frame to select whether it is to be used on the right ear or left ear, for example as shown in FIG. 8, whereby the handset is shown in solid lines on one side of the posts (43) and is shown in dashed lines on the other side of the posts (43). If a peson wants to use the holder (40) for the left ear, and it is set for the right ear, for example, he simply flips the handset (18) from one side of the upstanding post (43) to the other. With the metal hooks (15) and (16) engaging the frame (43), the handset easily slides around the top curve of the posts (43) to the other side, for example as shown in FIG. 8, and can be adjusted for the proper ear height and is therefore ready to be used as desired. The double curved base provides more steadiness to the holder. But if it is desired to make the holder (40) more compact, one of the elements (41) on the bottom thereof can be eliminated, for example as shown in embodiment (50) of FIG. 9. The FIG. 9 embodiment (50) operates precisely in the same fashion as embodiment FIGS. 7 and 8 except that the portion (51) of the holder (50) abuts a person's shoulder rather than the double base members (41) as in the FIGS. 7 and 8 embodiment.

Still another telephone handset holder, constructed in accordance with the present invention, is shown in FIGS. 10-13. The holder (60), as shown in FIG. 10, has Velcro strips (62) attached to each side of the upstanding posts (63). The upstanding posts (63) are connected together at the base by a shoulder abutment portion (61) of the holder (60). Complementary Velcro strips (64) are attached to the telephone handset (18), as shown in FIG. 11, and when the telephone handset (18) is positioned on the holder (60) in the position shown in FIG. 13, whereby Velcro portions (64) are pushed against the Velcro portions (62) of the holder (60), then the telephone handset (18) will be held in whatever place it is so positioned. Similarly, an elastic strap (65) is utilized in a very similar fashion to the elastic strap (14) in the embodiments referred to above; and this elastic strap (65) has Velcro strips (66) attached on both sides of each end thereof so that when the Velcro (66) is attached to an appropriate place on the Velcro (62) of the holder (60), for example as shown in FIG. 13, the elastic strap (65) can hold the holder (60) in place precisely in the fashion that the cord (14) holds the telephone handset (18) in position as shown in FIG. 1 embodiment.

It will be readily appreciated by those of ordinary skill in this art that the telephone handset (18) may easily be detached from one side of the holder (60), for example as shown in solid lines FIG. 13, to the other side of such holder (60), for example as also shown in FIG. 13 and whereby the elastic strap (65) may also be similarly utilized for using the telephone handset (18) either on the right side of a person's head, or on the left side.

Referring now to FIG. 14, a combination telephone handset and telephone handset holder (70) is shown. Ideally, this combination unit would be molded of a plastic material and the handset (72) would have a standard earphone portion (74) and a microphone portion (75). A conventional dialing system (76) would be provided centrally thereof and a standard button (78) would be utilized for turning off the handset unit when such button (78) is depressed and causing the handset (72) to be operative when it is not depressed, so that when the entire unit is laid down on a flat surface on the side shown in FIG. 14, the button (78) would be depressed and the unit ready for answering when it rings as is well-known in this art.

Portion (71) of this unit (70) is, of course, to rest against a person's shoulder and the upstanding posts (73) merely space the handset portion (72) upwardly to a position whereby it will reach a person's ear and mouth when in use. It will also be understood by those skilled in the art that these portions (73) could be constructed to be of a telescoping configuration, whereby the distance between the portion (71) and the handset portion (72) could easily be adjusted by telescoping these parts. As in the other embodiments, an elastic cord (14) is attached to posts (73) at one end and is selectively attachable or detachable by means of a hook and enlarged portion (79) receivable in a depression (80) in the other side of the other post (73).

Obviously many modifications and variations of the present invention are possible in light of the various teachings. It is therefore to be understood that, within the scope of the appended claims, the invention may be practiced otherwise than as specifically described.

I claim:

1. Apparatus for holding a telephone handset comprising:
   a frame;
   shoulder rest means on the bottom end of said frame for abutment with the top of a person's shoulder;
   attachment means on the top end of said frame for attaching a telephone handset to said frame; and
   elastic means attached to said frame for extending around a person's neck and biasing said frame towards said person's neck and thereby said handset towards said person's head, said elastic means being stretchable and in tension along its length.

2. The apparatus of claim 1 wherein said attachment means comprises Velcro fasteners.

3. The apparatus of claim 1 wherein said attachment means comprises elastic bands wrapped around said handset and around said frame.

4. The apparatus of claim 1 wherein the top end of said frame has a pair of spaced loops thereon and means for attaching said handset to either side of said loops.

5. The apparatus of claim 1 wherein said elastic means comprises a coiled tension spring connected at each end to an intermediate portion of said frame.

6. The apparatus of claim 1 wherein said frame is made of metal wire.

7. The apparatus of claim 1 wherein said frame is made of flat Plexiglass.

8. The apparatus of claim 1 wherein said frame is made of flat wood.

9. The apparatus of claim 1 wherein said frame is made of flat cardboard.

10. The apparatus of claim 1 wherein said attachment means, the housing of said handset and said frame are all formed in one integral piece of plastic material.

11. The apparatus of claim 1 wherein said attachment means is attached to an intermediate portion of said frame and a second shoulder rest means is disposed on the top end of said frame whereby a handset can be used on either the left shoulder or right shoulder.

12. The apparatus of claim 2 wherein said frame has Velcro on both sides thereof and the telephone handset has Velcro on the back side thereof whereby the handset can be easily attached or detached from either side of said frame.

13. The apparatus of claim 12 wherein said Velcro on said frame extends a substantial distance vertically whereby the distance of the handset with respect to the shoulder rest means can be easily adjusted.

14. The apparatus of claim 4 including means for permitting said handset to be shifted from one side to the other side of said spaced loops without detachment from said loops whereby the apparatus is quickly adaptable for use on either shoulder.

15. The apparatus of claim 5 wherein said coiled tension spring is attached to one side of the frame, said frame including means for selectively and detachably holding the other end of said coiled tension spring.

16. The apparatus of claim 1 wherein said attachment means attach to a straight portion of the frame.

* * * * *